(12) United States Patent
O'Hara et al.

(10) Patent No.: US 7,332,240 B2
(45) Date of Patent: Feb. 19, 2008

(54) SPATIALLY VARYING DIFFUSION MEDIA AND DEVICES INCORPORATING THE SAME

(75) Inventors: Jeanette E. O'Hara, Rochester, NY (US); Thomas A. Trabold, Pittsford, NY (US); Michael R. Schoeneweiss, W. Henrietta, NY (US); Joerg Roth, Trebur (DE)

(73) Assignee: General Motors Corporation, Detroit, MI (US)

( * ) Notice: Subject to any disclaimer, the term of this patent is extended or adjusted under 35 U.S.C. 154(b) by 570 days.

(21) Appl. No.: 10/628,318

(22) Filed: Jul. 28, 2003

(65) Prior Publication Data

US 2005/0026018 A1 Feb. 3, 2005

(51) Int. Cl.
*H01M 2/00* (2006.01)
*H01M 4/00* (2006.01)
*H01M 4/96* (2006.01)

(52) U.S. Cl. .......................... 429/34; 429/38; 429/39; 429/40; 429/42; 429/44

(58) Field of Classification Search ................ 429/42, 429/44
See application file for complete search history.

(56) References Cited

U.S. PATENT DOCUMENTS

| 5,350,643 | A |   | 9/1994  | Imahashi et al. |        |
|-----------|---|---|---------|-----------------|--------|
| 5,620,807 | A | * | 4/1997  | Mussell et al.  | 429/33 |
| 5,840,438 | A | * | 11/1998 | Johnson et al.  | 429/30 |
| 5,952,119 | A |   | 9/1999  | Wilson          |        |
| 5,998,058 | A |   | 12/1999 | Fredley         |        |
| 6,024,848 | A |   | 2/2000  | Dufner et al.   |        |
| 6,127,059 | A |   | 10/2000 | Kato            |        |
| 6,194,094 | B1 |  | 2/2001  | Sugawara et al. |        |
| 6,280,870 | B1 |  | 8/2001  | Eisman et al.   |        |
| 6,280,872 | B1 |  | 8/2001  | Ozaki et al.    |        |
| 6,303,245 | B1 |  | 10/2001 | Nelson          |        |
| 6,350,539 | B1 | * | 2/2002 | Wood et al.     | 429/34 |

(Continued)

FOREIGN PATENT DOCUMENTS

EP          0 846 347 B1      6/2000

(Continued)

OTHER PUBLICATIONS

Regan, Christopher; Mesoporous Structures; Apr. 8, 2002 http://www.rpi.edu/locker/25/001225 public_html/nano_02/cregan/regan/mesoporous.html.

(Continued)

*Primary Examiner*—Jonathan Crepeau
*Assistant Examiner*—Tony Chuo

(57) ABSTRACT

A diffusion media and a scheme for spatially varying the parameters of the diffusion media to address issues related to water management in electrochemical cells and other devices employing the diffusion media are provided. A device is configured to convert a hydrogenous fuel source to electrical energy and comprises an electrochemical conversion assembly, first and second reactant inputs, first and second product outputs, and first and second diffusion media. The device is configured such that a mesoporous layer is carried along at least a portion of a major face of one of the first and second diffusion media substrates. The mesoporous layer comprises a hydrophilic carbonaceous component and a hydrophobic component. The mesoporous layer occupies a substantially greater portion of one of the high or low $H_2O$ regions of the device, relative to the other of the high or low $H_2O$ region of the device.

43 Claims, 3 Drawing Sheets

U.S. PATENT DOCUMENTS

| | | | |
|---|---|---|---|
| 6,365,293 | B1 | 4/2002 | Isono et al. |
| 6,368,476 | B1 | 4/2002 | DeMarinis et al. |
| 6,413,664 | B1 | 7/2002 | Wilkinson et al. |
| 6,444,347 | B1 | 9/2002 | Ouvry et al. |
| 6,939,636 | B2 * | 9/2005 | Fuglevand et al. ........... 429/26 |
| 2002/0041992 | A1 * | 4/2002 | Zuber et al. .................. 429/44 |
| 2002/0051901 | A1 * | 5/2002 | Zuber et al. .................. 429/32 |
| 2002/0142205 | A1 | 10/2002 | Kim et al. |
| 2003/0198860 | A1 * | 10/2003 | Yasumoto et al. ............ 429/43 |

OTHER PUBLICATIONS

Han et al; Simple Silica-Particle Template Synthesis of Mesoporous Carbons; Chem. Commun., 1999, p. 1955.

* cited by examiner

US 7,332,240 B2

SPATIALLY VARYING DIFFUSION MEDIA AND DEVICES INCORPORATING THE SAME

CROSS-REFERENCE TO RELATED APPLICATIONS

This application is related to commonly assigned U.S. patent application Ser. No. 10/628,316, filed Jul. 28, 2003, and Ser. No. 10/628,856, filed Jul. 28, 2003, which issued as U.S. Pat. No. 6,967,039, the disclosures of which are incorporated herein by reference. The present application is also related to commonly assigned U.S. patent application Ser. No. 10/345,121, filed Jan. 15, 2003, now abandoned.

BACKGROUND OF THE INVENTION

The present invention relates to the design and manufacture of diffusion media and, more particularly, to diffusion media for use in electrochemical cells where water management is a significant design issue.

BRIEF SUMMARY OF THE INVENTION

According to the present invention, a diffusion media and a scheme for spatially varying the parameters of the diffusion media to address issues related to water management in electrochemical cells and other devices employing the diffusion media are provided. In accordance with one embodiment of the present invention, a device is configured to convert a hydrogenous fuel source to electrical energy. The device comprises an electrochemical conversion assembly, first and second reactant inputs, first and second product outputs, and first and second diffusion media.

The electrochemical conversion assembly configured to partition the device into first and second flow field regions. The first reactant input and the first product output are in communication with the first flow field region, The first diffusion media comprises a porous diffusion media substrate configured to pass multiphase reactants between the first flow field region and the electrochemical conversion assembly. The second reactant input and the second product output are in communication with the second flow field region. The second diffusion media comprises a porous diffusion media substrate configured to pass multiphase reactants between the second flow field region and the electrochemical conversion assembly.

The device is configured such that at least one of the first and second diffusion media comprise a region subject to relatively high $H_2O$ concentrations and a region subject to relatively low $H_2O$ concentrations. A mesoporous layer is carried along at least a portion of a major face of one of the first and second diffusion media substrates and comprises a hydrophilic carbonaceous component and a hydrophobic component. The mesoporous layer occupies a substantially greater portion of one of the high $H_2O$ region and the low H2O region relative to the other of the high $H_2O$ region and the low H2O region.

In accordance with another embodiment of the present invention, the mesoporous layer comprises a hydrophilic carbonaceous component and a hydrophobic component. At least one of the first and second diffusion media substrates comprises a relatively high porosity region and a relatively low porosity region. The relatively high porosity region of the substrate occupies a substantially greater portion of the high $H_2O$ region and the relatively low porosity region of the substrate occupies a substantially greater portion of the low $H_2O$ region.

Accordingly, it is an object of the present invention to provide a means for addressing water management issues in diffusion media and devices employing such diffusion media. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
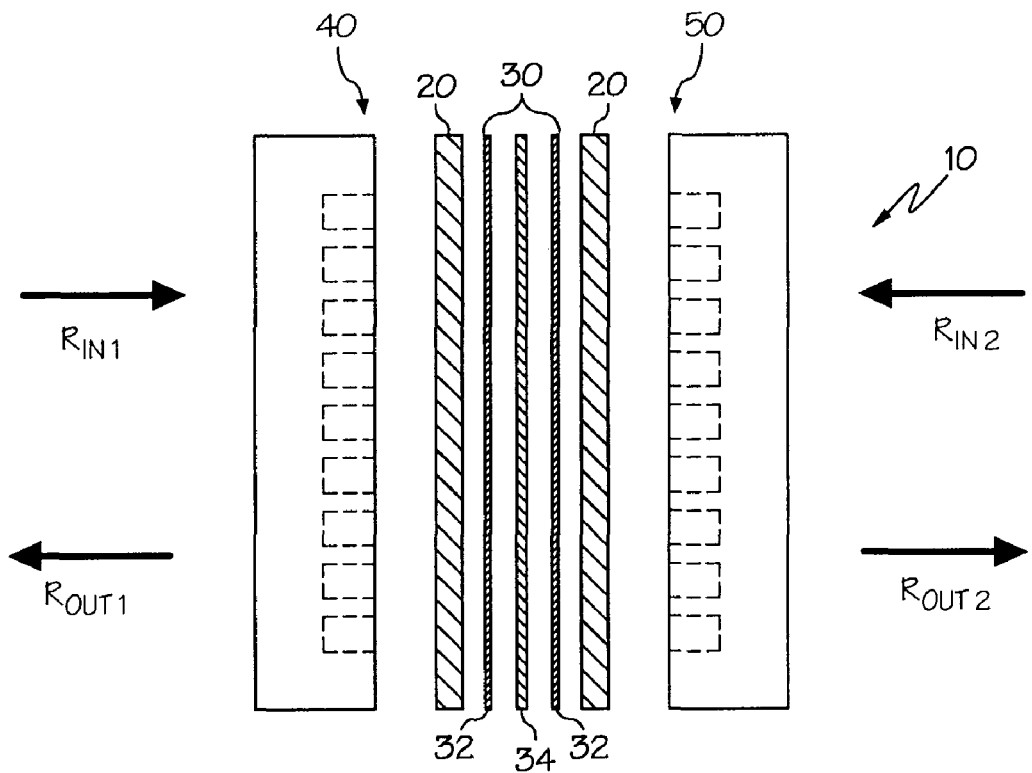
FIG. 1 is a schematic illustration of a fuel cell incorporating a porous diffusion media according to the present invention.
Figure 2:
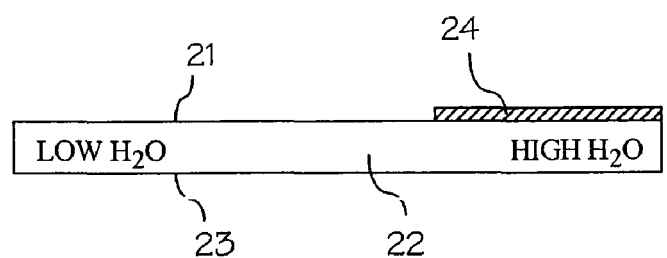
FIGS. 2-9 are schematic illustrations of porous diffusion media according to various embodiments of the present invention.

Referring initially to FIG. 1 a fuel cell 10 incorporating a porous diffusion media 20 according to the present invention is illustrated. Specifically, the fuel cell 10 comprises an electrochemical conversion assembly in the form of a membrane electrode assembly 30 interposed between an anode flow field region 40 and a cathode flow field region 50 of the fuel cell 10. It is contemplated that the flow fields 40, 50 and the electrochemical conversion assembly may take a variety of conventional or yet to be developed forms without departing from the scope of the present invention. Although the particular form of electrochemical conversion assembly is beyond the scope of the present invention, in the illustrated embodiment, the electrochemical conversion assembly comprises a membrane electrode assembly 30 including respective catalytic electrode layers 32 and an ion exchange membrane 34.

The present invention is not directed to the specific mechanisms by which the fuel cell 10 converts a hydrogenous fuel source to electrical energy. Accordingly, in describing the present invention, it is sufficient to note that the fuel cell 10 includes, among other things, an electrochemical conversion assembly configured to partition the device into the first and second flow field regions 40, 50, and a first reactant input $R_{IN\ 1}$ and a first product output $R_{OUT\ 1}$ in communication with the first flow field region 40. The first diffusion media 20 comprises a porous diffusion media substrate 22 that passes multiphase reactants between the first flow field region 40 and the membrane electrode assembly 30. Similarly, a second reactant input $R_{IN\ 2}$ and a second product output $R_{OUT\ 2}$ are in communication with the second flow field region 50 and a second diffusion media 20 passes reactants between the second flow field region 50 and the membrane electrode assembly 30. For example, by way of illustration and not limitation, the first reactant input $R_1$ may carry a humidified hydrogenous fuel mixture to an anode side of the fuel cell 10, the second reactant input $R_2$ may carry a humidified oxidant mixture to the cathode side of the fuel cell 10, and the reactant outputs $R_{OUT}$ may carry products of the reactions on each side of the fuel cell 10.

The present inventors have recognized that the water management properties of the diffusion media 20 should be spatially optimized across the diffusion media because the water demands vary across the diffusion media as a function of the amount of water handled by particular portions of the diffusion media 20. Specifically, a particular electrochemical conversions device may be configured such that one or both of the diffusion media comprise a region that is subject to relatively high operational $H_2O$ concentrations and a region that is subject to relatively low operational $H_2O$ concentrations. For example, the region of a cathode side diffusion media proximate the second product output $R_{OUT\,2}$, e.g., the cathode exit, may be required to transfer a greater volume of water than the region proximate the second reactant input $R_{IN\,2}$, e.g., the cathode input. Similarly, the region of an anode side diffusion media proximate the first product output $R_{OUT\,1}$, e.g., the anode exit, may be operate under dryer conditions than the region proximate the first reactant input $R_{IN\,1}$, e.g., the anode input.

The diffusion media 20 illustrated in FIGS. 2-9 present a means for addressing such water management issues. Specifically, referring FIGS. 2 and 3, a mesoporous layer 24, which may be carried along either of the major faces 21, 23 of the diffusion media substrates 20, is positioned to occupy a substantially greater portion of either the high $H_2O$ region (see FIG. 2) or the low $H_2O$ region (see FIG. 3). Referring to the embodiment of FIG. 2, where the mesoporous layer 24 occupies a substantially greater portion of, or is confined to, the high $H_2O$ region, then the mesoporous layer should be configured to enhance $H_2O$ transfer properties of the diffusion media substrate 22. Conversely, referring to the embodiment of FIG. 3, where the mesoporous layer 24 occupies a substantially greater portion of, or is confined to, the low $H_2O$ region, then the mesoporous layer should be configured to diminish the $H_2O$ transfer properties of the diffusion media substrate 22.

A variety of mesoporous layer parameters including porosity, thickness, degree of substrate infiltration, etc., may be optimized for either enhancing or diminishing water transfer properties of the layer. For example, the porosity of the mesoporous layer 24 may be generally higher when the layer is utilized in the high $H_2O$ region, where increased wicking is required. In the case where the mesoporous layer 24 comprises a hydrophilic carbonaceous component and a hydrophobic component, the porosity of the layer 24 may be increased by providing about 80 wt % of the carbonaceous component when used in the high $H_2O$ region, as compared to between about 90 wt % and about 95 w % of the carbonaceous component in the low $H_2O$ region.

Suitable carbon particles for the mesoporous layer 24 include, for example, carbon black, graphite, carbon fibers, fullerenes and nanotubules. In addition to the high surface area carbon, the hydrophilic carbonaceous component of the mesoporous layer 24 may comprise a minor portion of carbon graphite to enhance electrical conductivity. The hydrophobic component may comprise a fluorinated polymer, e.g., polytetrafluoroethylene (PTFE), polyvinylidene fluoride (PVDF), polyvinyl fluoride (PVF), a combination of fluorinated polymers, or any other suitable hydrophobic material or combination of materials.

In specific embodiments of the present invention, the hydrophilic carbonaceous component of the mesoporous layer 24 in the high $H_2O$ regions may comprises a moderate surface area carbon characterized by a surface area of between about 60 $m^2/g$ and about 300 $m^2/g$ and a mean particle size of between about 15 nm and about 70 nm. Conversely, in the low $H_2O$ regions, the hydrophilic carbonaceous component may comprise a high surface area carbon characterized by a surface area of above about 750 $m^2/g$ and a mean particle size of less than about 20 nm. In other embodiments of the present invention, the mesoporous layer infiltrates the diffusion media substrate to a depth of less than 10 μm when used in the high $H_2O$ regions and to a depth of less than 25 μm when used in the low H2O regions.

Figure 4:
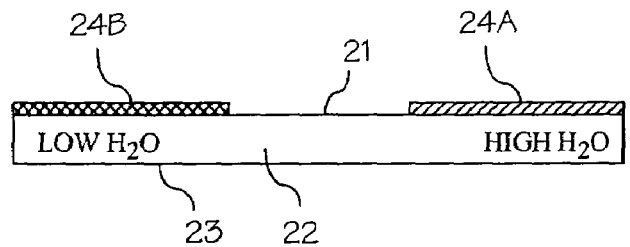

Referring now to FIG. 4, a plurality of mesoporous layers 24A, 24B are carried along respective portions of a major face 21 of the diffusion media substrates 22. The mesoporous layer 24A is configured to enhance the $H_2O$ transfer properties of the diffusion media substrate 22 and, as such, occupies the high $H_2O$ region. Further, the mesoporous layer 24B is configured to diminish the $H_2O$ transfer properties of the diffusion media substrate 22 and, as such, occupies a substantially greater portion of the low $H_2O$ region. As a result, water will tend to be wicked away from the high $H_2O$ region and retained in the low $H_2O$ region—improving device performance.

Figure 5:
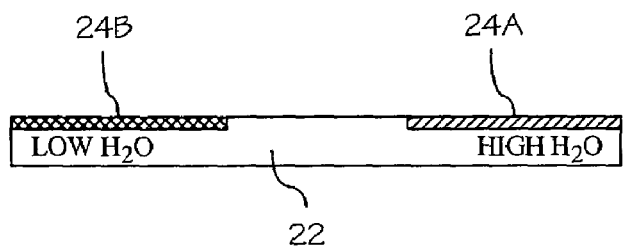
Figure 6:
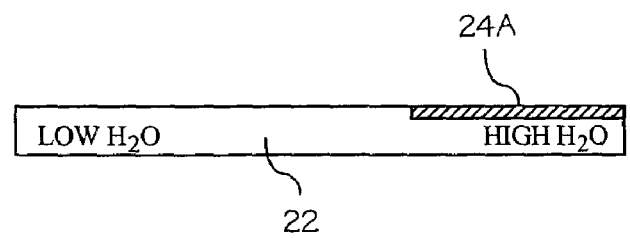
Figure 7:
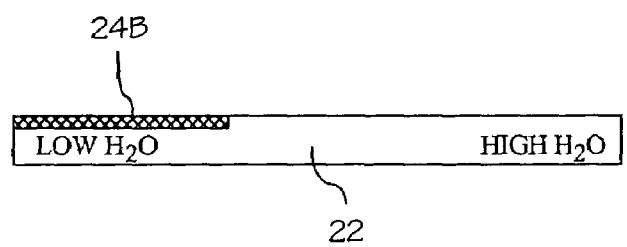

FIGS. 5-7 illustrate embodiments of the present invention where the mesoporous layer 24 is carried along a reduced thickness portion of the substrate 22. A substantially planar surface profile may be maintained in the diffusion media by ensuring that the difference in thickness of the substrate 22 introduced the reduced thickness portion of the substrate 22 is sufficient to accommodate for the increase in diffusion media thickness introduced by the mesoporous layer 22.

Figure 8:
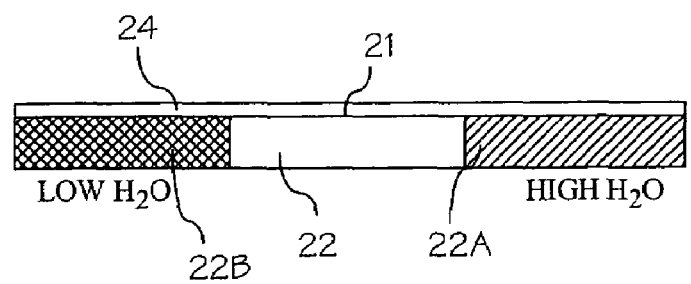

An alternative means for addressing water management issues across a diffusion media according to the present invention is illustrated in FIG. 8. In FIG. 8, a substantially uniform mesoporous layer is carried along the major face 21 of the diffusion media substrate 22 and the diffusion media substrate 22 is provided with a relatively high porosity region 22A in the high $H_2O$ region of the diffusion media and a relatively low porosity region 22B in the low $H_2O$ region of the diffusion media.

The diffusion media substrate may comprise a carbonaceous fibrous matrix, e.g., carbon fiber paper and may be characterized by a porosity of above about 70% in the high $H_2O$ regions and between about 70% and about 75% in the low $H_2O$ regions. The substrate may define a thickness of between about 100 μm and about 300 μm in the high $H_2O$ regions and a thickness of between about 190 μm and about 300 μm in the low $H_2O$ regions. Further, the substrate may be characterized by a mean pore size of above about 20 μm in the high $H_2O$ regions and less than about 25 μm in the low $H_2O$ regions.

Figure 9:
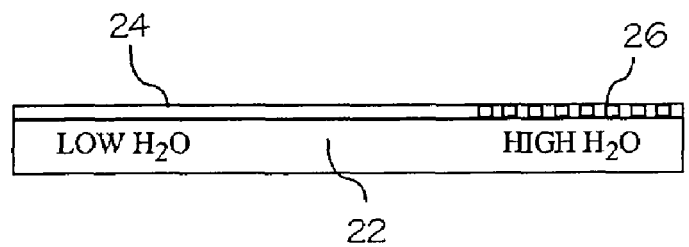
Figure 10:
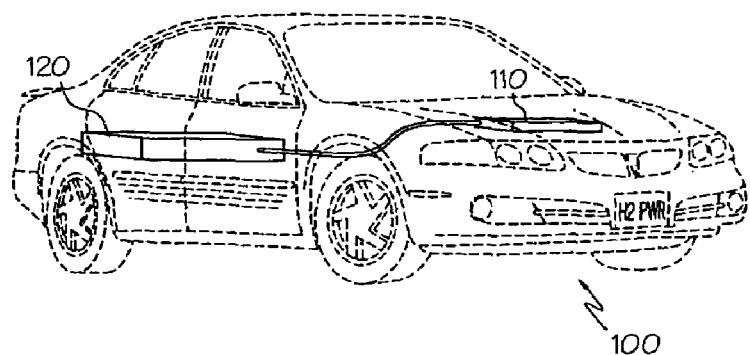
FIG. 10 is a schematic illustration of a vehicle incorporating a fuel cell according to the present invention.

Referring finally to FIG. 9, the mesoporous layer 24 may be configured such that it occupies substantial portions of both the high $H_2O$ region and the low H2O region. To address variations in water management demands across the diffusion media, the mesoporous layer 24 is provided with a region of increased porosity relative to a remaining portion of the mesoporous layer. Specifically, the region of increased porosity of the mesoporous layer 24 is defined by a plurality of megapores 26 formed in the layer 24. The region of increased porosity occupies the high $H_2O$ region of the diffusion media while the remaining portion of the mesoporous layer 24 occupies the low $H_2O$ region of the diffusion media. Although the particular dimensions associated with the megapores 26 will vary according to the specific demands of the application at issue, it is contemplated that suitable pore sizes will range from about 100 μm to about 500 μm.

In many embodiments of the present invention the mesoporous layer 24 is more effective in addressing water management issues if it is positioned against the membrane electrode assembly 30 of the fuel cell 10, as opposed to being positioned to face the flow field of the cell 10. Nevertheless, it is contemplated that the diffusion media substrate 22 may carry the mesoporous layer 24 along either major face 21, 23 of the substrate 22 regardless of which face is positioned against the membrane electrode assembly 30. Further, the mesoporous layer 24 at least partially infiltrates the diffusion media substrate 22. The extent of the depth of infiltration into the diffusion media substrate 22 will vary widely depending upon the properties of the mesoporous layer 24 and the diffusion media substrate 22. In some embodiments of the present invention, it may be advantageous to configure the mesoporous layer such that it is more porous than the fibrous matrix of the diffusion media substrate. For the purposes of defining and describing the present invention, it is noted that mesoporous structures are characterized by pore sizes that can range from a few nanometers to hundreds of nanometers.

Figure 3:
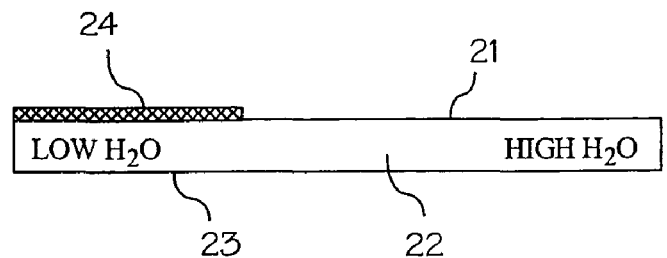

Referring now to FIG. 3, a fuel cell system incorporating diffusion media according to the present invention may be configured to operate as a source of power for a vehicle 100. Specifically, fuel from a fuel storage unit 120 may be directed to the fuel cell assembly 110 configured to convert fuel, e.g., H2, into electricity. The electricity generated is subsequently used as a motive power supply for the vehicle 100 where the electricity is converted to torque and vehicular translational motion.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise a diffusion media, a fuel cell incorporating a diffusion media according to the present invention, a vehicle incorporating a fuel cell according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A device configured to convert a hydrogenous fuel source to electrical energy, said device comprising:
   an electrochemical conversion assembly configured to partition said device into first and second flow field regions;
   a first reactant input and a first product output in communication with said first flow field region;
   a first diffusion media comprising a porous diffusion media substrate configured to pass multiphase reactants between said first flow field region and said electrochemical conversion assembly;
   a second reactant input and a second product output in communication with said second flow field region; and
   a second diffusion media comprising a porous diffusion media substrate configured to pass multiphase reactants between said second flow field region and said electrochemical conversion assembly, wherein
   said device is configured such that at least one of said first and second diffusion media comprise a region subject to relatively high $H_2O$ concentrations and a region subject to relatively low $H_2O$ concentrations,
   a mesoporous layer is carried along at least a portion of a major face of one of said first and second diffusion media substrates and comprises a hydrophilic carbonaceous component and a hydrophobic component, and
   said mesoporous layer occupies a substantially greater portion of one of said high $H_2O$ region and said low $H_2O$ region relative to the other of said high $H_2O$ region and said low $H_2O$ region, wherein
   (1) at least one of said first and second diffusion media substrate comprises an increased thickness portion and a reduced thickness portion and said mesoporous layer is carried along only said reduced thickness portion of at least one of said first and second diffusion media substrates and/or (2) said mesoporous layer at least partially infiltrates at least one of said first and second diffusion media substrates to a depth of greater than zero µm to about 10 µm in said high $H_2O$ regions and a depth of greater than 0 µm to about 25 µm in said low $H_2O$ regions; and
   said hydrophilic carbonaceous component comprises a moderate surface area carbon characterized by mean particle size of between about 15 nm and about 70 nm in said high $H_2O$ regions.

2. A device as claimed in claim 1 wherein said mesoporous layer is substantially confined to one of said high $H_2O$ region and said low $H_2O$ region.

3. A device as claimed in claim 1 wherein said mesoporous layer is configured to enhance $H_2O$ transfer properties of at least one of said first and second diffusion media substrates along said portion of said major face occupied by said mesoporous layer.

4. A device as claimed in claim 1 wherein said mesoporous layer occupies a substantially greater portion of said high $H_2O$ region.

5. A device as claimed in claim 1 wherein said mesoporous layer occupies a substantially greater portion of said high $H_2O$ region and is configured to enhance $H_2O$ transfer properties of at least one of said first and second diffusion media substrates along said portion of said major face occupied by said mesoporous layer.

6. A device as claimed in claim 1 wherein said mesoporous layer is configured to diminish $H_2O$ transfer properties of at least one of said first and second diffusion media substrates along said portion of said major face occupied by said mesoporous layer.

7. A device as claimed in claim 6 wherein said mesoporous layer occupies a substantially greater portion of said low $H_2O$ region.

8. A device as claimed in claim 1 wherein said mesoporous layer occupies a substantially greater portion of said low $H_2O$ region and is configured to diminish $H_2O$ transfer properties of at least one of said first and second diffusion media substrates along said portion of said major face occupied by said mesoporous layer.

9. A device as claimed in claim 1 wherein:
said electrochemical conversion assembly defines an anode side of said device and a cathode side of said device;
said first reactant input and said first product output are in communication with said anode side of said device;
said second reactant input and said second product output are in communication with said cathode side of said device.

10. A device as claimed in claim 9 wherein:
said mesoporous layer is configured to enhance $H_2O$ transfer properties of at least one of said first and second diffusion media substrates along said portion of said major face occupied by said mesoporous layer;
said region subject to relatively high $H_2O$ concentrations is proximate said second product output in communication with said cathode side of said device; and
said mesoporous layer occupies a substantially greater portion of said high $H_2O$ region proximate said second product output.

11. A device as claimed in claim 9 wherein:
said mesoporous layer is configured to enhance $H_2O$ transfer properties of at least one of said first and second diffusion media substrates along said portion of said major face occupied by said mesoporous layer;
said region subject to relatively high $H_2O$ concentrations is configured to allow said first reactant input in communication with said anode side of said device to flow through said region of high $H_2O$ concentration; and
said mesoporous layer occupies a substantially greater portion of said high $H_2O$ region proximate said first reactant input.

12. A device as claimed in claim 9 wherein:
said mesoporous layer is configured to diminish $H_2O$ transfer properties of at least one of said first and second diffusion media substrates along said portion of said major face occupied by said mesoporous layer;
said region subject to relatively low $H_2O$ concentrations is proximate said second reactant input in communication with said cathode side of said device; and
said mesoporous layer occupies a substantially greater portion of said low $H_2O$ region proximate said second reactant input.

13. A device as claimed in claim 9 wherein:
said mesoporous layer is configured to diminish $H_2O$ transfer properties of at least one of said first and second diffusion media substrates along said portion of said major face occupied by said mesoporous layer;
said region subject to relatively low $H_2O$ concentrations is configured to allow said first product output in communication with said anode side of said device to flow through said region of low $H_2O$ concentration; and
said mesoporous layer occupies a substantially greater portion of said low $H_2O$ region.

14. A device as claimed in claim 1 wherein a plurality of said mesoporous layers are carried along respective portions of a major face of one of said first and second diffusion media substrates.

15. A device as claimed in claim 14 wherein:
a mesoporous layer configured to enhance $H_2O$ transfer properties of at least one of said first and second diffusion media substrates occupies a substantially greater portion of said high $H_2O$ region; and
a mesoporous layer configured to diminish $H_2O$ transfer properties of said diffusion media substrate occupies a substantially greater portion of said low $H_2O$ region.

16. A device as claimed in claim 1 wherein a difference in thickness of said substrate introduced said reduced thickness portion of said substrate is sufficient to accommodate for an increase in diffusion media thickness introduced by said mesoporous layer.

17. A device as claimed in claim 1 wherein said diffusion media substrates comprises a carbonaceous fibrous matrix.

18. A device as claimed in claim 1 wherein said hydrophobic component of said mesoporous layer comprises a fluorinated polymer.

19. A device as claimed in claim 1 wherein said hydrophilic carbonaceous component of said mesoporous layer is selected from carbon black, graphite, carbon fibers, carbon fullerenes, carbon nanotubes, and combinations thereof.

20. A device as claimed in claim 1 wherein said moderate surface area carbon is characterized by a surface area of between about 60 $m^2/g$ and about 300 $m^2/g$.

21. A device as claimed in claim 1 wherein said hydrophilic carbonaceous component comprises a high surface area carbon characterized by a surface area of above about 750 $m^2/g$ and a mean particle size of less than about 20 nm in said low $H^2O$ regions.

22. A device as claimed in claim 1 wherein said mesoporous layer comprises about 80 wt % of said carbonaceous component in said high $H_2O$ region.

23. A device as claimed in claim 1 wherein said mesoporous layer comprises between about 75 wt % and about 85 wt % of said carbonaceous component in said high $H_2O$ region.

24. A device as claimed in claim 1 wherein said mesoporous layer comprises between about 90 wt % and about 95 w % of said carbonaceous component in said low $H_2O$ region.

25. A device as claimed in claim 1 wherein said mesoporous layer defines a thickness of from greater than 0 μm to about 20 μm in said high $H_2O$ regions.

26. A device as claimed in claim 1 wherein said mesoporous layer defines a thickness of between about 10 μm and about 40 μm in said low $H_2O$ regions.

27. A device as claimed in claim 1 wherein said mesoporous layer infiltrates at least one of said first and second diffusion media substrates to a depth of from greater than 0 μm to about 10 μm in said high $H_2O$ regions.

28. A device as claimed in claim 1 wherein said mesoporous layer infiltrates at least one of said first and second diffusion media substrates to a depth of from greater than 0 μm to about 25 μm in said low $H_2O$ regions.

29. A device as claimed in claim 1 wherein said device comprises a fuel cell.

30. A device as claimed in claim 29 wherein said device further comprises structure defining a vehicle powered by said fuel cell.

31. A device configured to convert a hydrogenous fuel source to electrical energy, said device comprising:
an electrochemical conversion assembly configured to partition said device into first and second flow field regions;
a first reactant input and a first product output in communication with said first flow field region;

a first diffusion media comprising a porous diffusion media substrate configured to pass multiphase reactants between said first flow field region and said electrochemical conversion assembly;

a second reactant input and a second product output in communication with said second flow field region; and a second diffusion media comprising a porous diffusion media substrate configured to pass multiphase reactants between said second flow field region and said electrochemical conversion assembly, wherein said device is configured such that at least one of said first and second diffusion media comprise a region subject to relatively high $H_2O$ concentrations and a region subject to relatively low $H_2O$ concentrations, a mesoporous layer is carried along at least a portion of a major face of one of said first and second diffusion media substrates and comprises a hydrophilic carbonaceous component and a hydrophobic component, at least one of said first and second diffusion media substrates comprises a relatively high porosity region and a relatively low porosity region, said relatively high porosity region of said substrate occupies a substantially greater portion of said high $H_2O$ region and said relatively low porosity region of said substrate occupies a substantially greater portion of said low $H_2O$ region, wherein (1) at least one of said first and second diffusion media substrate comprises an increased thickness portion and a reduced thickness portion and said mesoporous layer is carried along only said reduced thickness portion of at least one of said first and second diffusion media substrates and/or (2) said mesoporous layer at least partially infiltrates at least one of said first and second diffusion media substrates to a depth of greater than zero μm to about 10 μm in said high $H_2O$ regions and a depth of greater than 0 μm to about 25 μm in said low $H_2O$ regions; and said hydrophilic carbonaceous component comprises a moderate surface area carbon characterized by mean particle size of between about 15 nm and about 70 nm in said high $H_2O$ regions.

32. A device as claimed in claim 31 wherein said relatively high porosity region is characterized by a porosity of up to about 90%.

33. A device as claimed in claim 31 wherein said relatively low porosity region is characterized by a porosity of between about 70% and about 75%.

34. A device as claimed in claim 31 wherein said substrate is characterized by a porosity of above about 70% in said high $H_2O$ regions.

35. A device as claimed in claim 31 wherein said substrate is characterized by a porosity of between about 70% and about 75% in said low $H_2O$ regions.

36. A device as claimed in claim 31 wherein said substrate defines a thickness of between about 100 μm and about 300 μm in said high $H_2O$ regions.

37. A device as claimed in claim 31 wherein said substrate defines a thickness of between about 190 μm and about 300 μm in said low $H_2O$ regions.

38. A device as claimed in claim 31 wherein said substrate is characterized by a mean pore size of above about 20 μm in said high $H_2O$ regions.

39. A device as claimed in claim 31 wherein said substrate is characterized by a mean pore size of less than about 25 μm in said low $H_2O$ regions.

40. A device configured to convert a hydrogenous fuel source to electrical energy, said device comprising:

an electrochemical conversion assembly configured to partition said device into first and second flow field regions;

a first reactant input and a first product output in communication with said first flow field region;

a first diffusion media comprising a porous diffusion media substrate configured to pass multiphase reactants between said first flow field region and said electrochemical conversion assembly;

a second reactant input and a second product output in communication with said second flow field region; and a second diffusion media comprising a porous diffusion media substrate configured to pass multiphase reactants between said second flow field region and said electrochemical conversion assembly, wherein said device is configured such that at least one of said first and second diffusion media comprise a region subject to relatively high $H_2O$ concentrations and a region subject to relatively low $H_2O$ concentrations, a mesoporous layer is carried along at least a portion of a major face of one of said first and second diffusion media substrates and comprises a hydrophilic carbonaceous component and a hydrophobic component, said mesoporous layer occupies portions of said high $H_2O$ region and said low $H_2O$ region, said mesoporous layer comprises a region of increased porosity relative to a remaining portion of said mesoporous layer, said region of increased porosity of said mesoporous layer occupies a substantially greater portion of said high $H_2O$ region relative to said low $H_2O$ region, and said remaining portion of said mesoporous layer occupies a substantially greater portion of said low $H_2O$ region relative to said high $H_2O$ region.

41. A device as claimed in claim 40 wherein said region of increased porosity of said mesoporous layer is defined by a plurality of megapores characterized by a pore size of between about 100 μm and about 500 μm.

42. A device configured to convert a hydrogenous fuel source to electrical energy, said device comprising:

an electrochemical conversion assembly configured to partition said device into first and second flow field regions;

a first reactant input and a first product output in communication with said first flow field region;

a first diffusion media comprising a porous diffusion media substrate configured to pass multiphase reactants between said first flow field region and said electrochemical conversion assembly;

a second reactant input and a second product output in communication with said second flow field region; and a second diffusion media comprising a porous diffusion media substrate configured to pass multiphase reactants between said second flow field region and said electrochemical conversion assembly, wherein said device is configured such that at least one of said first and second diffusion media comprise a region subject to relatively high $H_2O$ concentrations and a region subject to relatively low $H_2O$ concentrations, a mesoporous layer is carried along at least a portion of a major face of one of said first and second diffusion media substrates and comprises a hydrophilic carbonaceous component and a hydrophobic component, said mesoporous layer at least partially infiltrates at least one of said first and second diffusion media substrates to a depth of greater than 0 µm to about 10 µm in said high $H_2O$ regions and a depth of greater than 0 µm to about 25 µm in said low $H_2O$ regions; and said mesoporous layer occupies a substantially greater portion of one of said high $H_2O$ region and said low $H_2O$ region relative to the other of said high $H_2O$ region and said low $H_2O$ region.

43. A device configured to convert a hydrogenous fuel source to electrical energy, said device comprising:

an electrochemical conversion assembly configured to partition said device into first and second flow field regions;

a first reactant input and a first product output in communication with said first flow field region;

a first diffusion media comprising a porous diffusion media substrate configured to pass multiphase reactants between said first flow field region and said electrochemical conversion assembly;

a second reactant input and a second product output in communication with said second flow field region; and a second diffusion media comprising a porous diffusion media substrate configured to pass multiphase reactants between said second flow field region and said electrochemical conversion assembly, wherein said device is configured such that at least one of said first and second diffusion media comprise a region subject to relatively high $H_2O$ concentrations and a region subject to relatively low $H_2O$ concentrations, a mesoporous layer is carried along at least a portion of a major face of one of said first and second diffusion media substrates and comprises a hydrophilic carbonaceous component and a hydrophobic component, said mesoporous layer at least partially infiltrates at least one of said first and second diffusion media substrates to a depth of greater than 0 µm to about 10 µm in said high $H_2O$ regions and a depth of greater than 0 µm to about 25 µm in said low $H_2O$ regions, and at least one of said first and second diffusion media substrates comprises a relatively high porosity region and a relatively low porosity region, said relatively high porosity region of said substrate occupies a substantially greater portion of said high $H_2O$ region and said relatively low porosity region of said substrate occupies a substantially greater portion of said low $H_2O$ region.

* * * * *